United States Patent [19]
Foucault et al.

[11] 3,822,809
[45] July 9, 1974

[54] LOOSE PRODUCT METERING APPARATUS

[76] Inventors: Pierre A. Foucault, 12 Avenue du General de Gaulle, 78 Croissy S/Seine; Jacques P. M. Pellerin, 57 Boulevard de la Republique, 91 Soisy S/Seine, both of France

[22] Filed: Feb. 8, 1973

[21] Appl. No.: 330,745

[30] Foreign Application Priority Data
Dec. 18, 1972 France .............................. 72.44967

[52] U.S. Cl.................................. 222/71, 222/413
[51] Int. Cl............................................ B67d 5/16
[58] Field of Search ...................... 222/71, 239–242, 222/55, 410–414; 198/64, 318; 214/17 CA; 425/145, 149, 204

[56] References Cited
UNITED STATES PATENTS
| | | | |
|---|---|---|---|
| 742,591 | 10/1903 | Clark | 222/413 |
| 2,003,417 | 6/1935 | Andreas | 222/318 |
| 2,800,252 | 7/1957 | Wahl | 222/55 |
| 3,047,034 | 7/1962 | Sassmannschausen | 222/413 |
| 3,057,522 | 10/1962 | Reed | 222/413 |

FOREIGN PATENTS OR APPLICATIONS
863,092  3/1961  Great Britain ...................... 425/204

Primary Examiner—Allen N. Knowles
Assistant Examiner—H. Grant Skaggs, Jr.
Attorney, Agent, or Firm—Diller Brown Ramik & Wight

[57] ABSTRACT

Apparatus for metering loose products such as powder or granules, comprises co-axial metering and compensating worms rotatable in a casing from which the metering worm delivers product into a delivery tube. The worms are independently driven and servo-control means dependent on the torque of the metering worm controls the rate of rotation of the compensating worm which feeds product to the metering worm. By this means the amount of product distributed by the metering screw is strictly proportioned to the speed of rotation of the metering screw.

9 Claims, 6 Drawing Figures

3,822,809

LOOSE PRODUCT METERING APPARATUS

BACKGROUND OF THE INVENTION

1. Field of the Invention

This invention relates to apparatus for the continuous metered distribution of loose products such as powders, granules, or the like.

It is known that industries, such as the building, chemical, and foodstuff industries, are increasingly using apparatus for mixing at least two products in predetermined proportions.

2. Description of the Prior Art

For the purpose of suitably effecting the required continuous proportioning, proportioning devices are already known which can be divided into two main types, namely:

Volumetric metering, with or without correction;

Weight metering, likewise with or without correction.

In Volumetric metering apparatus use is most frequently made of a screw adapted to extract the product from a hopper; and since this extraction is subject to irregularities, a manually or automatically operated correction device is added.

Weigh metering apparatus, which in principle is more accurate, functions in accordance with two different main techniques.

In the first case "batches" are first weighed discontinuously, and are then equalised; this procedure, although logical in itself, has the defect of allowing only relatively low weighing frequencies, of the order of one weighing every 2 or 3 minutes, thus giving a low rate of flow which is not suitable in all cases. Moreover, difficulties arise when it is required to convert the weighed batches into a regular, instantaneous flow.

In the second case the weighing is effected continuously on conveyor belts or other belts performing a continuous movement.

The major disadvantages of this procedure are caused by constantly variable elements, for example belt tension or dynamic fall of the products, which obviously falsify the results.

Moreover, continuous, instantaneous mixers, which are increasingly used and in which the passage time of the product is very short, amounting to about 1 second, require a metering device which is extremely accurate for this time scale.

It is an object of the present invention to obviate or greatly to reduce the disadvantage briefly set forth above and to provide for this purpose an apparatus which is simple to produce, particularly reliable in operation, and has remarkable metering accuracy.

SUMMARY

According to the invention apparatus for effecting continuous metered distribution of a dry loose pulverulent product, such as granules, powders, or the like, comprising a metering screw and a compensating screw each supported for independent rotation in a casing having a product outlet to receive product fed thereto by the metering screw, a hopper from which product is received by the compensating screw for movement thereby to the metering screw, and servo-control means arranged to rotate the compensator screw in dependence on the rate at delivery of product by the metering screw, The speed of the metering screw is a function of the desired flow.

The speed of the compensator screw is entirely different and may be produced by a variable speed motor servo-controlled by the flow of the metering screw.

Complete, regular filling of the metering screw brings about in fact a reaction on the walls of the sleeve or casing surrounding it, and a variation of this filling, and consequently of this reaction, is translated either into a variation of thrust on a shaft driving the metering screw or into a variation of the driving torque of this screw.

It is these variations which are utilised for driving the compensator screw, through a servo-control which may be mechanical, electronic, or of other suitable kind.

With the aid of the apparatus according to the invention the amount of products distributed by the metering screw is strictly proportional to the speed of rotation of the latter and because of the servo-control of the compensator screw the filling of the metering screw and the compactness of the product delivered by it are in fact unaffected by irregularities of supply.

Because of the flexibility of the apparatus according to the invention on the one hand, and because of its remarkable accuracy on the other hand, it will be understood that an apparatus of this kind is capable of serving numerous applications in connection with the proportioning of pulverulent products, particularly the proportioning of plaster, cement, and other binders before their introduction into a mixer which is known per se.

According to one aspect of the invention at least the metering screw is hollow and an end portion of the compensator screw extends into the interior of the metering screw.

According to another aspect of the invention, the compensating and metering screws have their axes of rotation in alignment and in continuation of one another. Preferably the compensator screw has a larger diameter than that of the metering screw; the compensator screw is rotatable by a motor having a constant drive torque, and the metering screw is rotatable by a motor having a variable speed dependent on the required rate of product delivery.

BRIEF DESCRIPTION OF THE DRAWINGS

The invention will now be described by way of example, with reference to the accompanying drawings in which.

DESCRIPTION OF PREFERRED EMBODIMENTS

In the embodiment illustrated in FIGS. 1 to 5, a metering device, indicated generally by 10, for products or materials in powder form or in the form of granules, flakes, fibres, or the like, is located between a product supply station 11 and a receiving apparatus 12, for example a mixer where the product is delivered in amounts determined with remarkable accuracy.

Figure 2:
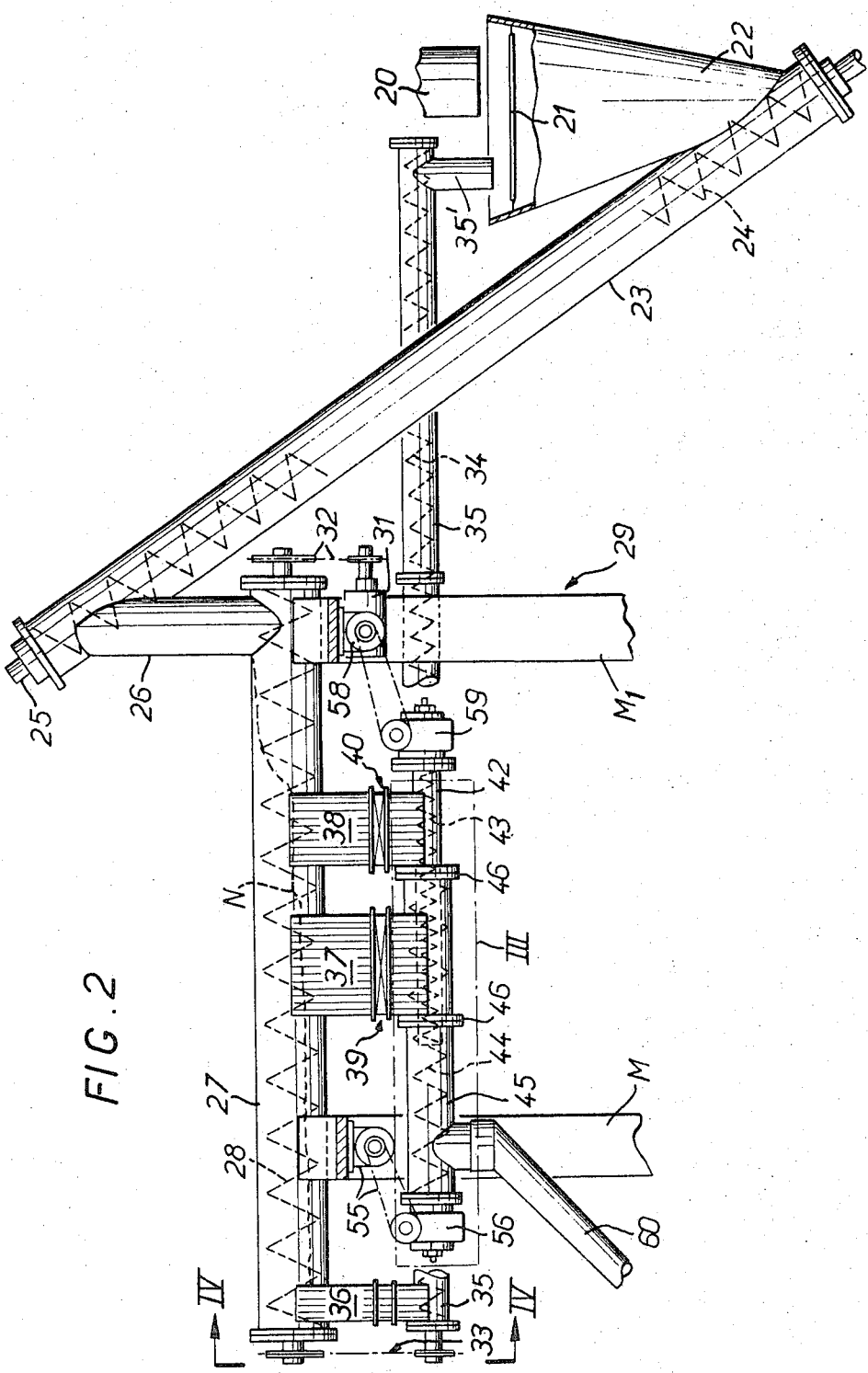
FIG. 2 is a view to an enlarged scale, of a part of the apparatus.

As can be seen more clearly in FIG. 2, the metering device comprises a product supply means, shown diagrammatically at 20, which pours product onto a sieve 21 located at the top of a receiving vessel 22.

To the base of the vessel 22 there is connected, in any suitable manner, a casing 23 which extends upwardly and inside which an elevator screw 24 is rotatable.

At the upper end of the casing 23 there is disposed a length of piping 26 which is directed downwardly and communicates with the interior of a cylindrical sleeve 27 which has a substantially horizontal axis and accommodates a feed screw 28 or other transport means. The sleeve 27 is supported by a frame indicated generally by 29.

Figure 4:
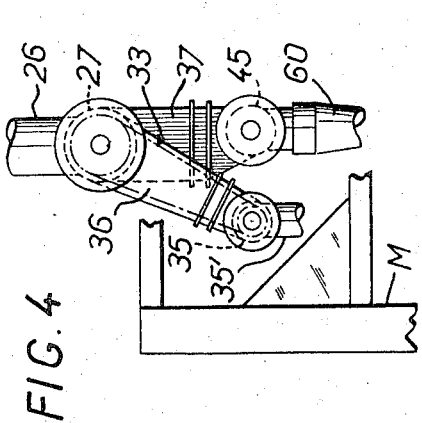
FIG. 4 is an end view on the line IV—IV in FIG. 2.
Figure 1:
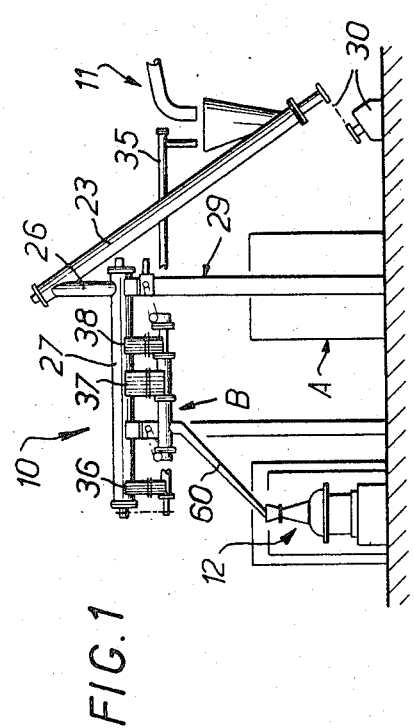
FIG. 1 is a diagrammatic elevation of apparatus according to the invention.

The elevator screw 24 is rotated by a motor-transmission unit 30, located for example at the bottom part in FIG. 1, while the feed screw 28 is rotated by a motor 31 and a transmission means 32 (FIG. 2).

The end of the feed screw 28 opposite that connected to the motor 31 is provided with transmission means 33 adapted to drive a screw 34 housed in a tube 35 which, by way of a bridge pipe 36, receives any surplus product. The tube 35 discharges through a vertical portion 35' above the sieve 21 and thus closes the feed circuit.

In the example illustrated a first hopper 37 and a second hopper 38 are fluid-tightly connected to the cylindrical sleeve 27, and the bottom of each of the hoppers 37, 38 is provided with vibrating sieves or other vibrators known per se shown diagrammatically at 39 and 40.

The second hopper 38 (FIGS. 2 and 3), which is the smaller in cross-section in the embodiment illustrated, discharges into a cylindrical distribution casing 42 in which is located a screw 43, hereinafter referred to as a compensator screw, while a screw 44, hereinafter referred to as a metering screw, is located in a casing or pipe 45; the casing 45 and the casing 42 are rigidly joined by flanges 46 and they are connected, likewise rigidly, to the sleeve 27, which in turn is carried with the aid of bearings 47, by uprights M, M1 of the frame 29.

At least the metering screw 44 is a hollow helix, the outer edges of which are tangent to the walls of the casing 45 in which the screw turns; in the example illustrated the compensator screw 43 is also a hollow helix.

Figure 3:
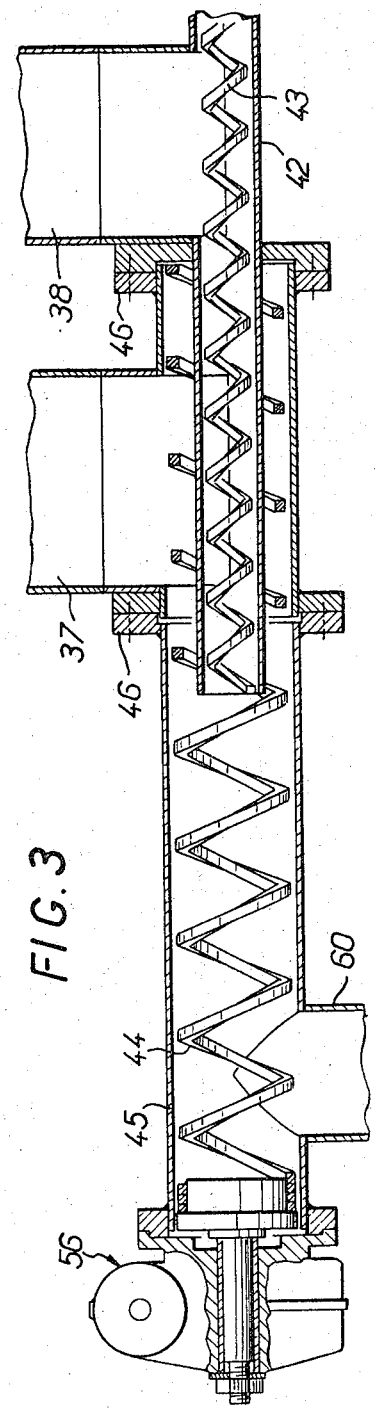
FIG. 3 is a section, to an enlarged scale, of the part indicated by B in FIG. 1.

The metering screw 44 and the compensator screw 43, which can be seen more clearly in FIG. 3, thus have their outer edges tangent respectively to the casing 45 and to the casing 42. The compensator screw 43 has a smaller diameter than the metering screw 44. The compensating screw 43 is coaxial with the metering screw 44 and the free end of the compensating screw 43 is engaged in the metering screw 44, being situated slightly beyond, that is to the left as viewed in FIG. 2, of the first hopper 37.

The metering screw 44 is rotated in its casing 42 by an electric motor and transmission means 55 carried by the upright M of the frame and by means of a motor-reduction gear unit 56 disposed at the end of the cylindrical distribution casing 42.

The compensator screw 43 is rotated by similar independent means, more precisely by an electric motor 58 carried by the upright M1 of the frame and by reduction gearing 59 fixed on the free end of the casing 42.

The two electric motors 55 and 58 are of the kind the speed of which is variable during operation and they are connected to an electronic control cabinet indicated by A in FIG. 1.

The operation of the apparatus is as follows:

The pulverulent product is supplied continuously, and in amply sufficient amounts into the cylindrical sleeve 27 and is moved along the sleeve 27 by the feed screw 28. In the course of its travel some of the product falls into the smaller hopper 38 and some into the larger hopper 37 from which, by way of the vibrators 39, 40, it is fed into the cylindrical feed casing 45.

Since the metering screw 44 is rotated at a predetermined speed, it will be understood that it transports a predetermined amount of product, which is delivered into a distribution tube 60 which preferably can be turned to any position at which product is to be delivered therefrom; the amount of product delivered produces on the threads of the metering screw 44, and consequently on the drive means 55, 56, a resisting torque the value of which is dependent on the amount of product transferred.

If, therefore, for any reason the amount of product transported by the metering screw 44 should vary, the torque on the motor 55 will also vary; since this motor controls the motor 31 of the compensator screw 43 with the aid of the electronic control cabinet A, the speed of rotation of the compensator screw 43 is automatically controlled in accordance with the torque recorded at the motor 55 of the metering screw 44.

To be more specific, the compensator screw 44 intervenes as an additional regulating screw in the event of the metering screw 44 not delivering a predetermined amount of product into the distribution tube 60.

Briefly, the amount of product delivered into the distribution tube 60 is always equal to a selected value, whatever irregularities may be caused by the metering screw 44.

It will therefore be understood that this amount may be adjustable at will in accordance with the requirements, the function of the compensator screw 43 being identical after suitable adjustment of the motor driving the metering screw 44.

In the foregoing, the speed of rotation of the compensator screw 43 is controlled by the variations of torque recorded at the motor 55 driving the metering screw 44.

Figure 5:
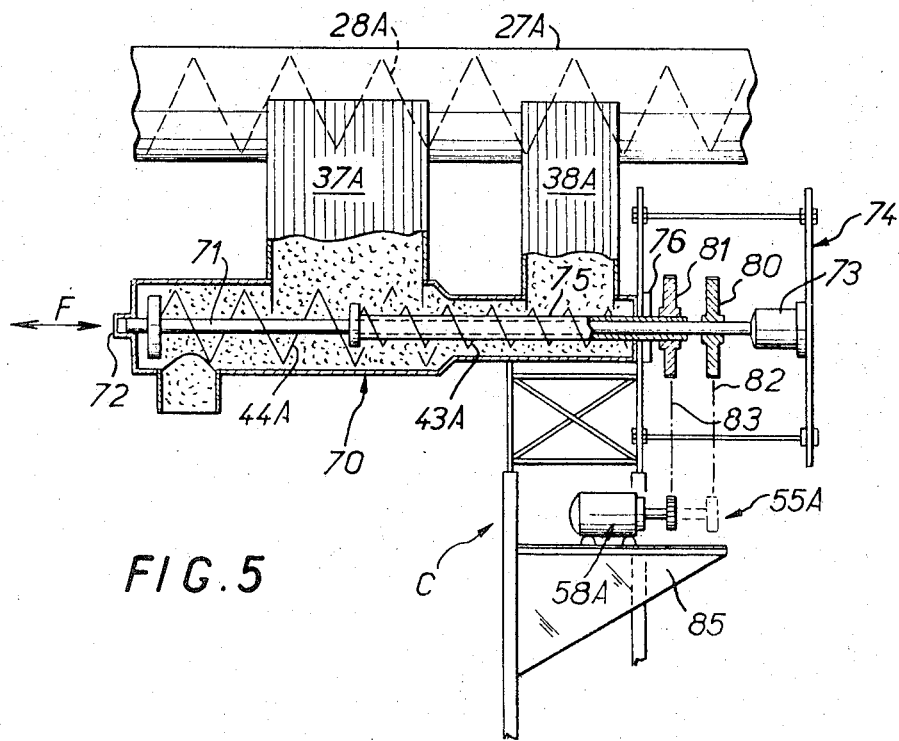
FIG. 5 illustrates diagrammatically an alternative form of the apparatus.

In the alternative embodiment illustrated in FIG. 5, in which similar reference accompanied by the suffix A are used to designate similar elements to those in the previous embodiment, it is seen that the metering screw 44A and the compensator screw 43A are accommodated in a single casing 70 carrying first and second hoppers 37A, 38A, the bottom part of each of which has its outlet vertically in line with the said screws, the whole arrangement being carried by a frame given the general designation C.

The metering screw 44A is associated with a shaft 71 adapted to move longitudinally, as indicated by the arrow F, between two thrust bearings 72, 73. The thrust bearing 73 is carried by a bracket 74 and has adjustable means which are adapted to control the drive motor 55A of the compensator screw 43A.

The compensator screw 43A is mounted on a sleeve 75 which forms a bearing for the shaft 71 and is supported by a fluid-tight beairng 76 fastened to the frame.

Gears or pulleys 80, 81 keyed respectively on the shaft 71 and the sleeve 75 are connected through transmission means 80, 83 to the drive motors 55A, 58A mounted on a suitable support 85.

During operation, when the resisting torque applied to the metering screw 44A is modified through a shortage or an excess of product, the floating shaft 71 acts accordingly on the thrust bearing 73, which in turn acts instantaneously on the compensator screw 43A, thus having the effect of delivering into the casing of the metering screw 44A an additional metered amount of product, or of slowing down the delivery of the product, thus compensating for irregularities in distribution by the metering screw 44A.

Beyond the hoppers 37, 38 the sleeve 27 usually still contains product, as indicated by the broken line N in FIG. 2.

The remaining product is recycled to the receiving vessel 22 by means of the elements described in connection with FIG. 2, that is to say the bridge pipe 36, the tube 35, the screw 34 associated with the tube 35, and the pipe 35' situated vertically in line with the vessel 22.

A recycling device of this kind is not shown in the alternative arrangement illustrated in FIG. 5, but it will easily be understood that this alternative could be equipped with a recycling device of this kind.

The metering and compensator screws are preferably, but not obligatorily, driven in opposite directions and therefore have contrary threads. Adjustment of the whole arrangement is facilitated thereby.

Furthermore, in a simplified embodiment (not illustrated), the hopper associated with the metering screw is omitted. The metering screw is then fed with product solely by the compensator screw, whereas in the previous embodiment it is supplied at least partly through its hopper. It will be understood that the servo-control of the compensator screw can, if desired, be effected by any suitable mechanical, electronic, or other means.

Figure 6:
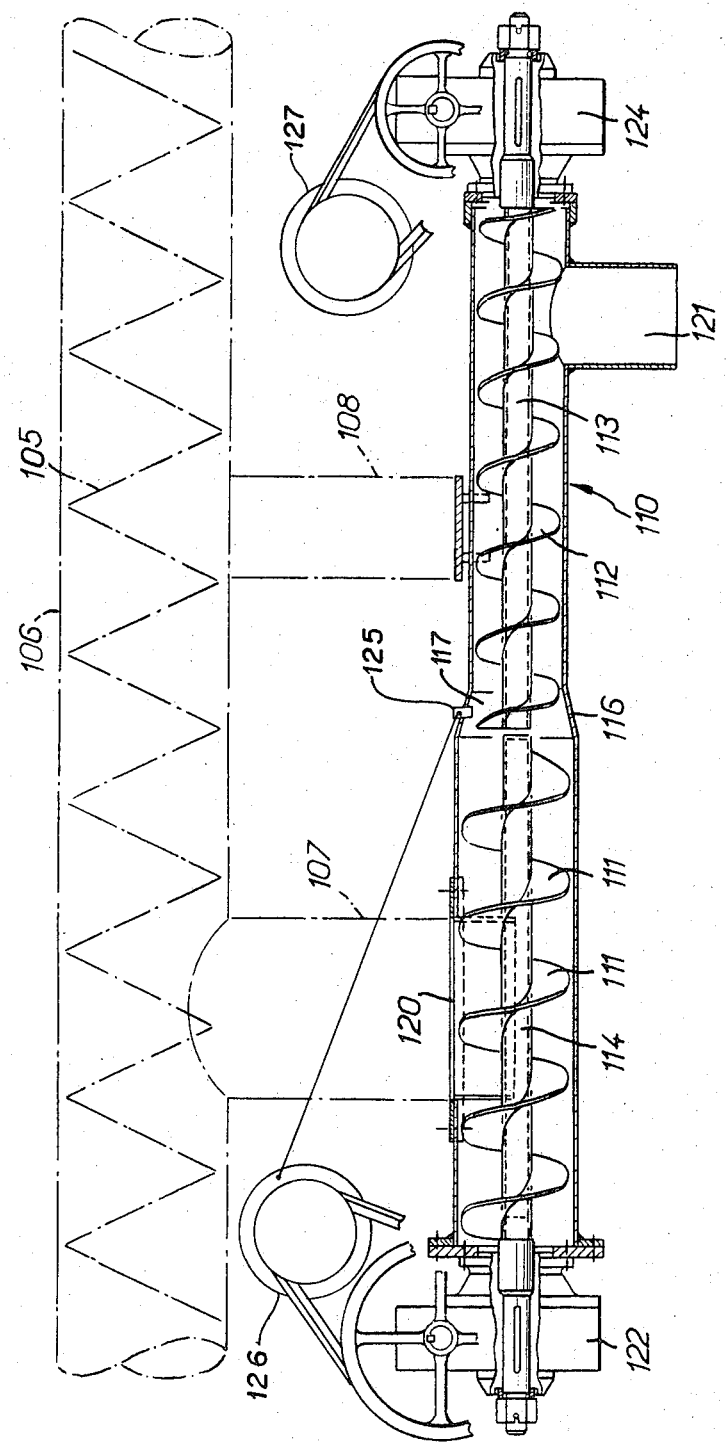
FIG. 6 is an elevation, in longitudinal section, of another alternative form of the apparatus.

Reference will now be made to FIG. 6, in which there are shown in dot-and-dash lines a product feed screw 105 accommodated in a sleeve 106; 107 designates a branch intended to pass product into metering apparatus which is shown in solid lines and which comprises essentially a casing 110 housing a compensator screw 111, situated on the left of the Figure, and a metering screw 112 situated on the right of the Figure.

The casing 110 is suspended from the sleeve 106 by means of a tie member indicated at 108.

The screws in this embodiment are solid and their axes 113 and 114 of rotation are aligned one with the other.

The compensator screw 111 has a larger diameter than the metering screw 112, and they are both mounted for rotation in the casing with just the clearance necessary for operation.

The free end of the compensator screw 111 is located adjacent to a central zone 116 in the casing. The zone 116 forms a conditioning chamber 117 and the free end of the compensator screw 111 is situated at the inlet of the chamber 117, while the free end of the metering screw rotates in the chamber 117.

An entry 120 is provided in the portion of casing accommodating the compensator screw 111, while an outlet 121 is provided in the portion of casing accommodating the metering screw 112.

Towards the entry 120 the compensator screw 111 is connected by a reduction device 122 to a drive motor 126 which is of the direct current, constant torque type.

At the end thereof nearest the outlet 121 the metering screw 113 is connected through a reduction gearing 124 to a drive motor 127, the speed of rotation of which is variable in dependence on the required delivery.

With the aid of a device of this kind complete, regular filling of the metering screw is obtained, and in accordance with its speed of rotation, the metering screw applies a perfectly proportioned amount of product to the outlet aperture 121.

In addition, the compensator screw 111, the drive motor of which has a constant torque whatever its speed, supplies into the conditioning chamber 117 at the input of the metering screw an amount of product at least equal to the required delivery. Thus, the conditioning chamber 117 and the portion of the casing in which the metering screw moves are filled continuously and homogeneously despite fluctuations due to variable feeding of product and whatever the speed of rotation of the screw, in accordance with the required delivery.

A pressure which is likewise constant, and which can be controlled by a suitable conventional pressure sensitive control device 125 mounted in the conditioning chamber 117 and coupled to the drive motor 126 for varying the speed thereof, is thus obtained in the conditioning chamber 117.

As the free or input end of the metering screw moves in the conditioning chamber and as its speed of rotation is known, the metering screw thus transports a determined amount of product.

It will be understood that with an apparatus of this kind, the simplicity of construction makes it possible to obtain continuous distribution of product in metered amounts with remarkable accuracy.

The invention is of course not limited to the embodiments selected and illustrated, which on the contrary are capable of modifications without thereby departing from the scope of the appended claims.

We claim:

1. Apparatus for effecting continuous metered distribution of a dry loose pulverulent product, such as granules, powders, and the like, said apparatus comprising a metering screw and a compensator screw each supported for independent rotation in a casing having a product outlet for receiving product fed thereto by said metering screw, separate drive means for said compensating and metering screws, a supply from which product is received by said compensator screw for movement thereby to said metering screw, and control means coupled to said compensating screw drive means for rotating said compensator screw in dependence on the rate of delivery of product by the metering screw, said compensator and metering screws having axes of rotation in alignment and in continuation of one another, said casing including a conditioning chamber between the ends of said casing and said compensator and metering screws have free ends facing each other inside said casing substantially vertically in the vicinity of the inlet end of said conditioning chamber.

2. Apparatus according to claim 1, wherein the casing is constituted by a sleeve which at its ends carries drive means for the respective screws.

3. Apparatus according to claim 1, wherein said drive means for said compensator screw includes a motor having a constant drive torque, and said drive means for said metering screw includes a motor having a variable speed dependent on the required rate of product delivery.

4. An apparatus for continuous metered distribution of a pulverulent product, comprising a casing accommodating a compensator screw and a metering screw, said metering screw being coaxial with and downstream from said compensator screw, said screws having facing adjacent ends, said casing having an inlet along said compensator screw and an outlet along said metering screw, constant torque drive means for said compensator screw compensating for variations in amounts of product supplied to the compensator screw to insure that said end of the metering screw adjacent said compensator screw is constantly filled, and adjustable speed drive means for said metering screw, the rotational speed of the metering screw determining the amounts of the product delivered at the output.

5. An apparatus according to claim 4, wherein said casing forms a conditioning chamber at said end of said metering screw, said end of said compensator screw adjacent said end of said metering screw being located at an upstream end of the conditioning chamber.

6. An apparatus according to claim 5, wherein said ends of said metering and compensator screws are free ends, and wherein said constant torque drive means and said adjustable speed drive means are arranged at other ends of their respective screws remote from each other.

7. An apparatus according to claim 5, wherein said ends of the compensator and metering screw are substantially perpendicular to the axis of the casing.

8. An apparatus according to claim 4, further comprising a hopper supplying unmetered quantities of the product at said inlet.

9. An apparatus according to claim 4, wherein the speed of said constant torque drive means is variable for compensating for changes in the amount of the product conveyed by said compensator screw.

* * * * *